Feb. 2, 1960     G. H. M. DAHL     2,923,085
ADJUSTABLE TROLLING GEAR
Filed July 11, 1957     2 Sheets-Sheet 1
FIG. 1
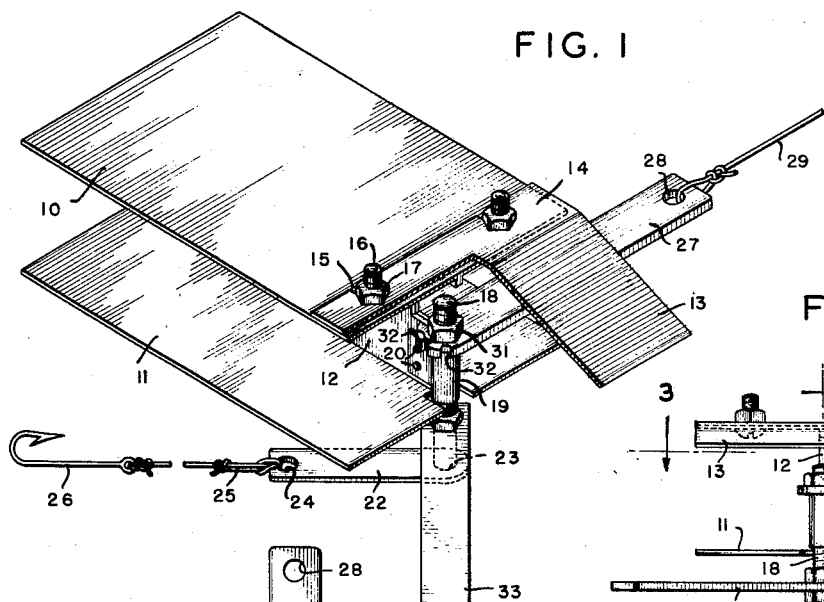
FIG. 2
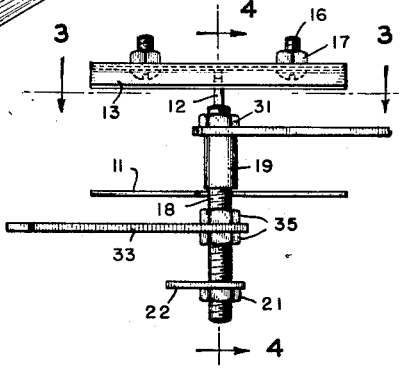
FIG. 4
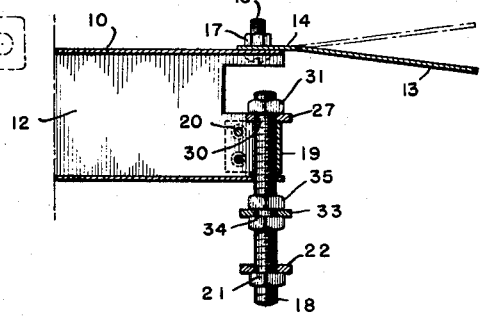
FIG. 3
FIG. 5
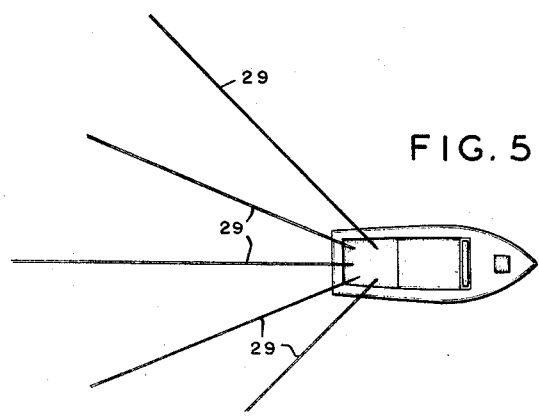
INVENTOR
G. H. M. DAHL
ATTORNEYS Feb. 2, 1960    G. H. M. DAHL    2,923,085
ADJUSTABLE TROLLING GEAR
Filed July 11, 1957    2 Sheets-Sheet 2
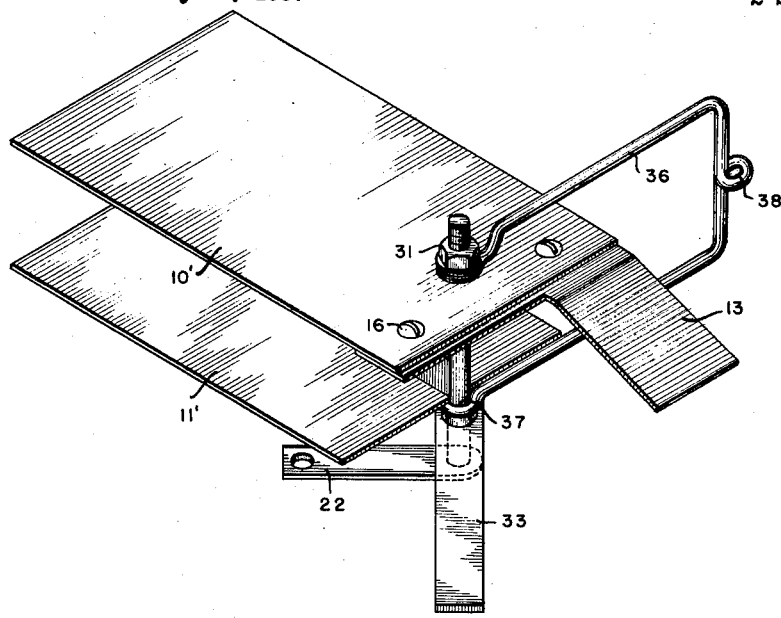
FIG. 6
FIG. 7
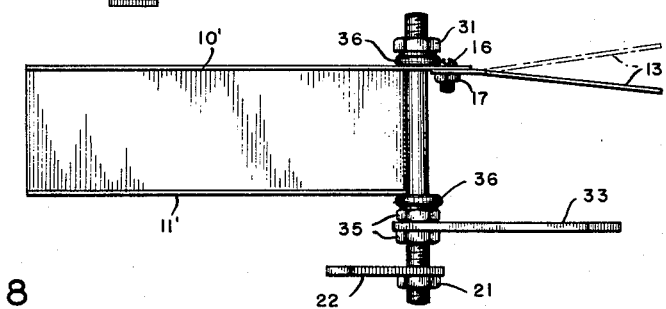
FIG. 8
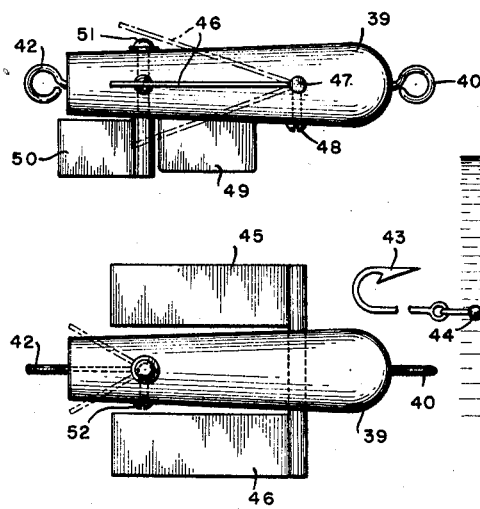
FIG. 9
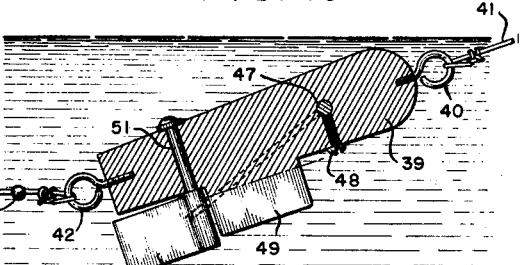
FIG. 10
INVENTOR
G.H.M. DAHL
ATTORNEYS

United States Patent Office 2,923,085
Patented Feb. 2, 1960

2,923,085

ADJUSTABLE TROLLING GEAR

George H. M. Dahl, Washington, D.C.

Application July 11, 1957, Serial No. 671,169

2 Claims. (Cl. 43—43.13)

This invention relates to the art of fishing including from a moving boat and referred to as trolling, and to equipment employed in such activity for obtaining the most satisfactory results.

The invention is particularly concerned with the equipment employed in trolling by which a hook is held both as to depth and location in the water in the best position to catch fish.

Equipment employed in trolling has been of such a character that the hook has followed the direction of the propelling force and its position with regard to depth has been determined by a weight or sinker applied to the line near the hook and by the speed of movement. Where several lines have been used it has been necessary to separate the lines substantially in order to prevent tangling of the lines when travelling in a straight line and it has been almost impossible to prevent the lines from tangling when rounding a curve. Also the equipment has been cumbersome, heavy, expensive and inefficient.

It is an object of the invention to overcome the difficulties enumerated and to provide simple and inexpensive trolling gear, of light weight, capable of being adjusted to various positions and depths in the water without adding or removing parts, and with such adjustment requiring a minimum expenditure of time and effort.

Another object of the invention is to provide trolling gear which can be adjusted in a manner to maintain multiple lines spaced apart in a manner that they will not come together and become entangled regardless of whether traveling in a straight line or around a curve.

Another object of the invention is to provide trolling gear which can be set to maintain a fish hook at a predetermined depth while being moved through the water and in a manner to require minimum attention.

Other objects and advantages will be apparent from the following description taken with the accompanying drawings wherein:

Fig. 1 is a perspective illustrating one application of the invention;

Fig. 2, a side elevation;

Fig. 3, a section on the line 3—3 of Fig. 2;

Fig. 4, a section on the line 4—4 of Fig. 2;

Fig. 5, a view from above illustrating the manner in which a number of lines may be maintained in spaced relation during trolling;

Fig. 6, a view similar to Fig. 1 of a slightly modified form of the invention;

Fig. 7, a side elevation;

Fig. 8, a side elevation of a further modified form of the invention;

Fig. 9, a top view of Fig. 8; and

Fig. 10, a section taken on the longitudinal center line illustrating the device in use.

Briefly stated, the invention comprises a trolling device in the general form of a section of an I-beam, of extremely light material such as sheet metal, and intended to be pulled from one end so that normally it will tend to travel in the direction it is pulled but having an angular depth control plate by which its depth in the water may be controlled. The device also has a tow bar or tongue adjustable from one side to the other through an angle of approximately 180°, such tow bar or tongue being mounted on an exteriorly threaded post or fulcrum fastened in place by suitable nuts. Such post or fulcrum also serves for the free pivotal mounting of a hook connector or mount to the outer or free end of which is connected a leader and to the opposite end of which is attached a suitable hook or lure. The nature and construction of the device is such that by adjusting the depth control the proper depth can be maintained, and by adjusting the angular location of the tow bar or tongue with the line attached to its outer end and through which the towing force is exerted the proper lateral position of the device may be determined and maintained.

With continued reference to the drawings the trolling gear of the present invention comprises an elongated member corresponding to a section of an I-beam, said member having plates or flanges 10 and 11 and an intermediate connecting web 12. This elongated member is of such character that when pulled by one end through the water it will tend to follow in a straight line.

In order to modify such straight line movement in the water a depth control member 13 is provided, such member being of a width substantially corresponding to the width of the plate or flange 10, and having a transverse relatively flat portion 14 provided with notches or slots 15 for the reception of threaded studs 16 engaged by nuts 17 for fastening the depth control in position. The forward portion of the depth control member is disposed at an angle to the rear flat portion 14 and when placed in one position will cause movement of the device in the direction of the inclination of said depth control member. By reversing the depth control member the angular portion may be disposed in a manner to produce an opposite movement of the device.

In order to draw the device through the water it is provided at its forward end with an externally threaded post 18 mounted by means of a clamp 19 and fasteners 20 to the upright web 12. On the lower end of the post is secured a nut 21 which retains a hook mount 22 having an opening 23 slightly larger than the post 18 so that such hook mount may rotate freely about such post. The opposite end of the hook mount is provided with an opening 24 so that a leader 25 may be secured to such hook mount and have at its outer end a hook or lure 26.

An adjustable tongue or tow bar 27 is provided having an opening 28 for a tow line 29 at one end and with an opening 30 at its opposite end in which the post 18 is received and being held thereon by means of a nut 31. The end of the tow bar 27 is provided with a series of spaced slots 32, permitting the adjustment of the tow bar by fitting the web 12 in the desired slot 32. Thus the tongue may be disposed in alignment with the web 12, at right angles thereto, or in an intermediate position. When the tow bar is in alignment with the axis of the control member a straight line of travel will result. When the control member is at right angles to the web 12 the path of movement will be in an intermediate position or approximately 45° from a straight line. A counter balance for the tow bar is provided in the form of a bar 33 provided with an opening 34 permitting it to be applied to the post 18 on which it is adapted to be held by a pair of nuts 35.

The construction described is of light weight however by setting the depth control member 13 the device may be caused to travel at the desired depth, and by setting the draw bar or tongue 27 at the proper adjustment the lateral position of the device may be determined.

Instead of the post 18 being fastened in place by means of a clamp 19 the post 18 may be mounted in any desired manner as for example by soldering or spot welding it to the upright web 12. Instead of the relatively flat tongue or draw bar 27 a substantially U-shaped draw bar or tongue 36 may be provided of wire or rod stock or of other material, such U-shaped member having an eye or opening 37 at each of its ends with an intermediate opening 38 for a line. The depth control member 13 may be secured beneath the upper flange 10' which is slightly longer than the lower flange 11' and the draw bar 36 affords a greater adjustment than the draw bar 27 otherwise the structure is substantially the same.

The depth and lateral position are the primary considerations of the present invention which are accomplished in the particular manner described in the preceding portion of the description which is by way of the illustration and not limitation.

If desired other types of depth and lateral position control structure may be provided. For example, the device may include an elongated body 39 of any suitable material which has at its front end a screw eye 40 for the attachment of a line 41 by which the device may be towed. At the rear end of the body 39 is another screw eye 42. A hook 43 may be fastened to the screw eye 42 by a swivel 44. Wings 45 and 46 are mounted on the shaft 47 in a transverse bore in the body 39 so that the wings may be set at any desired angle to control the depth at which the device is maintained in its movement through the water, a set screw 48 being provided for securing the wings in fixed position, such set screw being threaded in the body 39 and engaging the shaft 47 to lock it in adjusted position and thereby maintain the device at a level determined by the setting of the wings. Thus, the device may be set at the depth considered desirable by the fisherman in view of the conditions.

The body may have a fixed keel 49 depending from the underside of the body 39 and a rudder 50 mounted on a post 51 pivotally mounted in a vertical bore in the body 39, the rudder 50 being fixed to the post 51. The rudder 50 and post 51 are adapted to be maintained in adjusted position by means of set screw 52 threaded through the side of the body 39. The shaft 47 can be adjusted for the desired depth while the post 51 may be adjusted for the desired angle of travel.

From the foregoing it will be apparent that a number of trolling lines may be carried from a single boat, both from the sides and the stern, and such lines maintained at the desired depth and lateral position.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. An adjustable trolling device comprising a body of relatively light material in the general form of an I-beam, said body being adapted to be pulled through the water so that normally it would tend to travel in the direction of the pull, said body having depth control plate means connected thereto and being adjustable for controlling the depth of said body in the water, angular lateral position control plate means connected to said body and controlling the horizontal position of said body, the last mentioned means comprising a tow bar pivotally connected to said body and adjustable to an angle approximating 180°, and a counterweight attached to said body for counterbalancing the pull of the line to prevent rotation of the body.

2. An adjustable trolling device comprising a body of relatively lightweight material in the general form of an I-beam, an adjustable plate mounted on said body for controlling the depth of said body in the water, a tow bar adjustably connected to said body and having a plurality of slots for engagement with said body for controlling the lateral position of the latter, means attached to said body to prevent rotation thereof, and means for attaching a fish hook to said body.

References Cited in the file of this patent

UNITED STATES PATENTS

| | | |
|---|---|---|
| 1,188,583 | Townsend | June 27, 1916 |
| 1,200,135 | Reynolds | Oct. 3, 1916 |
| 1,733,777 | Comstock | Oct. 29, 1929 |
| 2,412,399 | Hendricks | Dec. 10, 1946 |
| 2,494,384 | Gadzinski | Jan. 10, 1950 |
| 2,545,185 | Winslow | Mar. 13, 1951 |
| 2,569,642 | Schnabel | Oct. 2, 1951 |
| 2,577,965 | Hinkson | Dec. 11, 1951 |
| 2,597,288 | Caldwell | May 20, 1952 |
| 2,648,929 | Dunn | Aug. 18, 1953 |
| 2,661,562 | Burney | Dec. 8, 1953 |